Patented Jan. 29, 1946

2,393,874

UNITED STATES PATENT OFFICE 2,393,874

ANTISWEAT COMPOSITIONS

Floyd E. Trent, San Lorenzo, Calif., assignor to William F. Geyer, San Pablo, and James H. Donnelly, San Lorenzo, Calif.

No Drawing. Application September 5, 1945, Serial No. 614,525

13 Claims. (Cl. 260—22)

This invention relates to coatings for surfaces subject to sweating for decreasing and controlling such sweating.

It has become expedient to have the walls, ceilings, floors, and other large surfaces within the interior of ships subject to enemy attack free of paint because explosions subject the paint in the vicinity thereof to such high temperatures that decomposition of the paint occurs with the production of very disagreeable acrid fumes which make it difficult for rescue, repair, and fire-fighting crews to remain at their posts. Leaving metal surfaces within the ships bare results in sweating or condensation thereon of moisture in the air. This condensate or sweat often runs to and collects on the floor or deck or any concavity in the structure of the ship, sometimes in such great quantities as to be disagreeable to the crew, seriously interfere with them in their efficient performance of their duties, and to make impossible the proper storage of material which should not become wet. The formation of the condensate or sweat is not as objectionable as its collection into pools and puddles on the floors or decks or in trough-like parts or concavities of the ship's structure, where it can slosh around as the ship rolls and pitches. Cork has been used to decrease the sweating, but it has the disadvantage of being combustible and also giving off very disagreeable fumes when subjected to high temperatures.

Objects of this invention are to provide coatings which control sweating, have sound absorbing properties, do not give off excessive amounts of, or substantially no, disagreeable fumes when subjected to relatively elevated temperatures as may be caused by near-by explosions, and to provide compositions which are easily and quickly applied to metal or other walls and adhere well thereto. Other objects will be apparent on a further reading of this specification.

The coatings of this invention are non-inflammable, non-combustible, non-toxic, do not melt in the vicinity of explosions, and do not, when exposed to heat, develop dangerous amounts of fumes which are toxic or so disagreeable as to make it impossible for personnel to enter or remain in the immediate vicinity.

The discovery that thin films of highly pigmented paint having a low organic binder content were fire retardent permitted the development of fire retardent anti-sweat paints. By substituting a granular fireproof exfoliated mica, commonly known as vermiculite, for granulated cork and by the use of a fire retardent binder paint, a reasonably effective anti-sweat paint was obtained. To apply this type coating, fire retardent binder paint was brushed on a surface and allowed to dry until tacky. Dry exfoliated mica granules were then blown on the surface with a compressed air gun, the granules sticking to the wet paint film. When dry, the surface was sprayed with one or more coats or fire retardent paint.

Although anti-sweat paint applied by the above method is reasonably effective in preventing sweating, these are serious objections to the application method. These are largely the result of physical weaknesses inherent in the exfoliated or expanded mica granules. This material has a very friable laminar structure which is readily broken up into small flakes. It has been found impossible to avoid the formation of many such flakes during shipment, storage, and application of the vermiculite granules. When the dry vermiculite is applied with a compressed air gun, the fine particles and flakes are readily carried by the air stream and impinge upon and adhere to the wet binder paint. However, the fine flakes tend to coat cover the surface and to prevent the adherence of the larger vermiculite granules which are essential for satisfactory anti-sweat or sound absorbing properties. A large amount of over-spray necessarily results from the bouncing off of many vermiculite particles from areas where the binder has already been covered. As a consequence, it is necessary to cover any machinery present and to clean up the area after the application.

When a vermiculite granule is forced against a film of the wet binder, it is cemented on only one side. Since these particles are laminar in structure and easily broken, the slightest abrasion is sufficient to split off the greater portion of the granules. Later application of a fire retardent paint coats only partially the vermiculite particles; it does not overcome this difficulty and does not produce a surface of any great physical strength.

Various workers have attempted to eliminate the difficulties described above by use of different methods for application of anti-sweat paint. The majority of these attempts have involved the premixing of fire retardent binder paint and vermiculite granules to form a slurry or porridge which can be sprayed on a surface in a single coat. However, when this is done, the porous vermiculite granules absorb large quantities of paint and their heat insulating and sound absorbing values are seriously impaired. To obtain a sprayable mixture, not less than ten pounds of paint must be mixed with one pound of vermiculite granules. To obtain satisfactory fire retardent properties in the anti-sweat paint film, not over 4.0 pounds of binder paint can be used for each pound of vermiculite. Therefore, so far as I am aware, all previous attempts to apply fire retardent anti-sweat paint in a single composite coat have been unsuccessful.

Proceeding in accordance with this invention one can make spray application of fire retardent anti-sweat paint in a single application. An essential and unique part of this process is the use of a binder water emulsion vehicle in which the binder provides the continuous phase. By the use of the emulsion vehicle, all the weaknesses of previous unsuccessful sprayed anti-sweat coatings are eliminated. The water acts as a carrier and permits the spraying of mixtures containing as little as 2.0 pounds of binder per pound of vermiculite; the vermiculite is preferentially wet by the dispersed water and its porous structure is not impaired. After application, the water evaporates, leaving the vermiculite securely cemented to the desired surface. The emulsion vehicle is quite thixotropic or false bodied with the result that any tendency of the admixed granular insulating material to separate during an extended storage period is absent. The coating has little tendency to sag and can be sprayed on a surface to a thickness of at least one-half inch in a single coat and upon a single application. Such a thick coating dries hard all the way through. These properties can be obtained in no other way than through the use of a suitable water-binder paint emulsion vehicle.

To apply vermiculite properly it is essential that it be applied in water emulsion along with a selected water insoluble binder. The simplest composition is one made up within the following limits:

| | Parts by weight |
|---|---|
| Vermiculite granules | About 4 |
| Water | 1 to 12 |
| Binder | ½ to 4 |
| Emulsifying agent | 0.01 to 1 |

The emulsifying agent and water hold the vermiculite in a stable suspension along with the binder until the mixture is sprayed against a wall. Then the binder sticks the emulsion onto the wall surface. This composition is prepared by forming the emulsion, including the binder, and finally stirring in the vermiculite. This material is not fire retardent. Its color is essentially that of the vermiculite. If desired, another application can be made later of a suitable color carrying paint.

When the fire retardent property is desired, a suitable pigment is added. A suitable thinner or solvent and a paint drier are also preferably included to ensure the composition is not too viscous with the added pigment and to improve drying; the inclusion of these is not essential although it is generally desirable. The foregoing composition can be modified by inclusion of the following:

| | Parts by weight |
|---|---|
| Pigment | 1-4 |
| Thinner or solvent | ½-2 |
| Paint drier | 0-0.1 |

In forming a composition including the pigment one proceeds to grind the pigment in the organic binder to form in effect a paint. Then the proper quantity of drier is added, if desired. Then the emulsifying agent and water are added and the mixture emulsified. Finally the vermiculite is stirred in, care being taken not to break either the emulsion or the fragile vermiculite particles.

Pigment is not essential to the composition but its inclusion is required if a composition having excellent fire retardent properties is desired. Almost any standard paint pigment can be used separately or in part depending upon the final color desired and the degree of fire-proofness desired. Titanium dioxide can be used to obtain hiding power, calcium carbonate and antimony oxide for fire retardence, lampblack or iron oxides for tinting and various extender pigments for control of viscosity.

The organic binder can be any material which, when applied as a film and in the presence of available oxygen, takes up oxygen to form a solid film. Such materials are generally well known in the paint art and include the drying oil modified polyhydric alcohol-polybasic acid varnishes such as oil modified glycery phthalate varnishes, and known equivalents such as oleo-resinous varnishes, phenolic resin varnishes and drying oils such as tung oil, linseed oil and dehydrated castor oil. In the case of the simplest composition, if the binder is extremely viscous, sufficient volatile solvent should be employed to enable the binder to be incorporated as a fluid in the emulsion. While in the above I have indicated that the vermiculite-binder ratio can vary between 8 to 1 and 1 to 1, it is a feature that the ratio can be and preferably is as high as 3 to 1 and as high as 8 to 1.

The thinner or solvent can be a petroleum naphtha, a coal tar naphtha, a lacquer solvent, turpentine or other type of paint thinner. In all cases, however, the organic binder should be soluble in the selected thinner and the thinner should have a satisfactory evaporation rate. The amount of thinner required is quite variable and depends upon the viscosity of the organic binder, the amount and other constituents of the composition.

The paint driers are the standard metallic soap driers of commerce. Lead and manganese naphthenates are particularly suitable. Sufficient drier should be used to cause the organic binder to dry at the optimum rate.

The amount of water required is dependent upon the other ingredients of the formula. It is essential, however, that sufficient water be used to obtain a fluid composition suitable for application through a spray gun or by a trowel application.

The emulsifier coats the vermiculite particles and cushions it during mixing and spraying. The emulsifying agent can be of any type which will (1) yield a stable dispersion of the organic binder and water, (2) hold the vermiculite in suspension and (3) include an element or group which evaporates from the film during the drying period and leaves a water insoluble residue. Ammonia fatty acid soaps, amine soaps and morpholine are particularly suitable for this service as are other like emulsifiers containing easily volatile constituents which evaporate to leave a substantially water insoluble residue.

The exfoliated mica can be used in finely divided form, as dust. It is preferable, however, that they be in granules of about the size of grape seeds, say about one-eighth to one-fourth inch. Smaller particles may but need not be mixed therewith. The light fluffy exfoliated mica is sold under various trade names including "Vermiculite" and "Zonolite." "Vermiculite" is required by some United States Navy specifications.

As a specific example and to illustrate preparation of a composition within the present invention, the following component raw materials were mixed and ground to produce a uniform homogeneous product free from grit and capable of being readily broken up by a paddle to a smooth, uniform pigmented paint of acceptable consistency; the paint did not liver, thicken, curdle, jell or show any other objectionable properties after long periods of storage.

|  | Pounds | Gallons |
|---|---|---|
| Calcium carbonate | 280.00 | 12.56 |
| Antimony oxide | 26.00 | 5.93 |
| Solution of alkyd resin | 78.50 | 10.00 |
| Paint thinner | 100.00 | 15.00 |
| Lead naphthenate drier | 1.20 | ¹ 16 |
| Manganese naphthenate drier | 0.50 | ¹ 8 |
| Cobalt naphthenate drier | 0.25 | ¹ 4 |
| Ammonium oleate | 3.00 | 0.40 |
| Water | 416.50 | 50.00 |
| "Vermiculite" | 166.00 | 41.40 |

¹ Fluid ounces.

The calcium carbonate is precipitated and conforms to U. S. Navy specifications 52 C 28. The antimony oxide is of the kind conventionally used for flame-proofing, and conforms to U. S. Navy specifications AN–TT–A–566. Both the calcium carbonate and the antimony oxide reduce inflammability. The alkyd resin is modified with linseed oil and is of medium oil length. The solution is made up of 60% by weight of such modified resin and 40% of volatile hydrocarbon paint thinner which can conveniently have a distillation range of about 165° to about 198° F. The solution conforms to U. S. Navy specifications 52 R 13, grade I. The thinner conforms to U. S. Navy specifications 52 T 9, grade II, this being the solvent used in the solution of alkyd resin and also the paint thinner used in the composition. The lead, manganese and cobalt naphthenate driers are solutions of such salts in volatile aromatic or petroleum solvent which may be the paint thinner described above, these solutions being respectively of about 24%, 8%, and 6% strength. These driers are in accordance with U. S. Navy specifications 52 D 7, types I, III and II, respectively. The vermiculite is in accordance with U. S. Navy specifications 52 V 19. The ammonium oleate is of commercial grade.

The calcium carbonate and antimony oxide are mixed into the alkyd resin solution with enough of the fifteen gallons of paint thinner to make what is known to paint makers as a good mill paste, that is a paste of consistency suitable for treatment in a paint mill. It is subjected to a medium fine grind in such a mill until the desired conditions of uniformity of paste and fineness of pigment (the finely divided solids) is attained. The balance of the fifteen gallons of paint thinner and the driers are then intermixed therewith.

The resulting mixture is poured, with vigorous stirring, into a solution made by stirring the ammonium oleate into the water. Rapid agitation of the resulting mixture is continued for the purpose of forming a homogeneous emulsion, and for complete emulsification the whole mass can be subjected to the action of a colloid mill. When emulsification is complete and the mass is homogeneous, it is subjected to the action of a mixer having a slow kneading effect, similar to that of a dough mixer. The vermiculite is added thereto, but not faster than it is taken up by, or is mixed into, the emulsion. As soon as all of it has been thoroughly mixed in, kneading is stopped because mechanical agitation tends to break down the exfoliated structure of the vermiculite. Shrinkage in volume occurs, the final volume being less than the sum of the volumes of the components.

The emulsion, both before and after the vermiculite is mixed into it, is of the water-in-oil type, the water being in the dispersed phase and the binder or binder and thinner being in the continuous phase. With this type of emulsion, contact of the binder with the vermiculite is lessened or avoided and sealing of the vermiculite due to such contact is similarly lessened or avoided.

This specific composition affords a nice balance between the filler and the solids in the binder, and at the same time the viscosity of the mass is controlled by the thinner to permit acceptance of the amount of vermiculite.

The completed composition is applied to the walls or other surfaces preferably with a spray gun or air brush having a passageway and orifice large enough to permit passage of the granules of filler material, and allowed to dry, whereupon undesirable sweating characteristics of the surfaces are decreased or avoided. Almost any pressure can be used for the spray gun, but low pressures are preferred since they produce less pressure on the composition and therefore compress the compressible vermiculite less, which, as appears above, can be pressed down to an extremely small volume with not very great pressure.

The coating composition should not be so thin that it will run and not adhere to the wall or other surface to which it is applied; and it should not be so thick that it cannot be properly applied by the spray gun. The preferred composition described above has a thinness or viscosity between such extremes. The viscosity is easily controlled by using more or less thinner or filler material and by the type of filler material. For example, more vermiculite is to be used if it is finer, and less if it is coarser, to obtain the same viscosity; and more or less of the same filler material will make the composition respectively more or less viscous. One gallon of the preferred composition will cover about 35 square feet of surface to be treated. The proportion of binder to filler in the dried coating is quite small, although the proportion of vehicle to filler in the composition when applied is considerably greater. This permits the pieces of vermiculite to be completely immersed in the liquid vehicle during application, while on drying the volume of vehicle shrinks to leave dry binder from the outer surface of which such pieces project. This provides a rough coating, having a maximum degree of roughness with respect to the size of the pieces of filler material, and a minimum amount of binder. Furthermore, the coating does not seal off the voids in the fluffy material, so that their fluffiness is maintained after repeated or continued condensation of moisture thereon. It is this roughness that prevents the flowing of condensed moisture and the collection thereof in pools or puddles. Water is the cheapest dissipatable extending agent and is therefore preferred. It is not miscible with the oil-modified alkyd resin, but it can form an emulsion.

The proportions of the different ingredients can be increased or decreased to a very considerable extent from those given in the formula referred to above, but the stated proportions give excellent results. However, if the proportion of water be substantially increased, the emulsion will change over from the water-in-oil type to the oil-in-water type with the water in the continuous or outside phase. This offers great contact of water with the vermiculite which would be more or less disintegrated thereby. An effective coating can result if such a composition be used promptly but it is not as suitable for storage.

Various drying and semi-drying oils can be substituted for the linseed oil for modifying the alkyd resin, but the choice should be such that the product dries reasonably fast as a matter of practical requirement. Alkyds are not essential, since the other binder or adhesive materials already mentioned can be used. Also, a varnish comprising a properly bodied drying oil, for example tung oil, linseed oil, or the like, in a solvent, can be substituted. For example, a varnish comprising about 60% by weight of heat-treated linseed oil to body it to a viscosity of Z4 on the Gardiner scale, and about 40% of the above mentioned volatile paint thinner can be used to replace the alkyd solution in whole or in part. If to replace it wholly, a volume of such varnish equal to about 62% of the volume of alkyd solution will give good results, and less in proportion if the replacement is in part only. This will require somewhat more drier than is stated in the above formula and the amount can be calculated on the basis of increased amount of drying oil present. Rosin-modified alkyd resin can also be substituted. Ester gum varnish containing dehydrated castor oil as plasticizer can also be substituted; for example, 60% by weight of a mixture of 100 pounds of ester gum and 30 gallons of dehydrated castor oil, with 40% of the volatile thinner referred to above. Other natural and artificial resins, gums, and adhesives can also be substituted.

Care should always be exercised that the substituent does not impart some undesired characteristic. The undesirablility of a characteristic may depend on the conditions of use. Where explosion and fire hazards are to be considered, phenolic resins should not be used as they give off noxious fumes at high temperatures, although they may perhaps be used under certain conditions where such hazards are remote. In such cases the fire retardant calcium carbonate and antimony oxide may be omitted, even from the preferred composition previously described, in which case a corresponding amount of liquid should also be omitted to maintain the proper viscosity for application by spray gun if that method of application is to be used.

Certain specific features and certain variations thereof have been referred to or illustrated for the purpose of explaining the invention without limiting it, but other variations are possible without departing from the spirit of the invention.

This is a continuation-in-part of my application Ser. No. 550,355, filed Aug. 21, 1944.

I claim:

1. A coating composition comprising a water-in-oil type emulsion of a drying oil modified alkyd resin and granular exfoliated micaceous material, the water being present in a quantity sufficient to provide a free flowing composition suitable for spraying, the alkyd resin being present in a quantity only sufficient to bond the micaceous material to a surface, the granular micaceous material being present in a quantity sufficient to provide a rough surface coat having heat insulation properties.

2. A coating composition comprising a water-in-oil type emulsion of a drying oil modified alkyd resin, a mineral paint pigment, and granular exfoliated micaceous material, the water being present in a quantity sufficient to provide a free flowing composition suitable for spraying, the alkyd resin being present in a quantity only sufficient to bond the micaceous material to a surface, the pigment being present in a quantity sufficient to increase fire resistance of an applied coating, the granular micaceous material being present in a quantity sufficient to provide a rough surface coat having heat insulation properties.

3. A coating composition comprising a water-in-oil type emulsion of a drying oil modified alkyd resin and granular exfoliated micaceous material, the water being present in a quantity sufficient to provide a free flowing composition suitable for spraying, the alkyd resin being present in a quantity only sufficient to bond the micaceous material to a surface, the granular micaceous material being present in a quantity several times the weight of the binder and sufficient to provide a rough surface coat having heat insulation properties.

4. A coating composition comprising a water-in-oil type emulsion of a drying oil modified alkyd resin, a mineral paint pigment, and granular exfoliated micaceous material, the water being present in a quantity sufficient to provide a free flowing composition suitable for spraying, the alkyd resin being present in a quantity only sufficient to bond the micaceous material to a surface, the pigment being present in a quantity sufficient to increase fire resistance of an applied coating, the granular micaceous material being present in a quantity several times the weight of the binder and sufficient to provide a rough surface coat having heat insulation properties.

5. A coating composition comprising a water-in-oil type emulsion of a drying oil modified alkyd resin and granular exfoliated micaceous material, all substantially of a size between an eighth and a quarter of an inch in size, the water being present in a quantity sufficient to provide a free flowing composition suitable for spraying, the alkyd resin being present in a quantity only sufficient to bond the micaceous material to a surface, the granular micaceous material being present in a quantity sufficient to provide a rough surface coat having heat insulation properties.

6. A method of making a composition having useful antisweat properties when applied to a surface and dried, the method comprising grinding a paint pigment into an oil modified alkyd resin in solution in a paint thinner, adding an emulsifier and water and emulsifying the resulting mixture to form a water-in-oil type emulsion, and then kneading in an exfoliated micaceous material.

7. A method of making a composition having useful antisweat properties when applied to a surface and dried, the method comprising grinding a paint pigment into an oil modified alkyd resin in solution in a paint thinner, adding an emulsifier and water and emulsifying the foregoing mixture to form a water-in-oil type emulsion, and then kneading in an exfoliated micaceous material, said emulsion containing proportionately and by weight about 47.1 parts of the resin, 416.5 parts of water, 306 parts of the pigment, and 166 of the micaceous material.

8. A coating composition comprising a mixture of (a) water-in-oil type emulsion of water and an organic binder capable of taking up oxygen when exposed to air and drying to form a tenacious film and (b) a granular exfoliated micaceous material, the water being present in a quantity sufficient to provide a free flowing composition suitable for spraying, the binder being present in a quantity only sufficient to bond the micaceous material to a surface, the granular micaceous material being present in a quantity sufficient to provide a rough surface coat having heat insulation properties.

9. A coating composition comprising a mixture of water-in-oil type emulsion of water and an organic binder capable of taking up oxygen when exposed to air and drying to form a tenacious film, a mineral paint pigment, and granular exfoliated micaceous material, the water being present in a quantity sufficient to provide a free flowing composition suitable for spraying, the binder being present in a quantity only sufficient to bond the micaceous material to a surface, the pigment being present in a quantity sufficient to increase fire resistance of an applied coating, the granular micaceous material being present in a quantity sufficient to provide a rough surface coat having heat insulation properties.

10. A coating composition comprising a mixture of water-in-oil type emulsion of water and an organic binder capable of taking up oxygen when exposed to air and drying as a tenacious film and granular exfoliated micaceous material, the water being present in a quantity sufficient to provide a free flowing composition suitable for spraying, the binder being present in a quantity only sufficient to bond the micaceous material to a surface, the granular micaceous material being present in a quantity several times the weight of the binder and sufficient to provide a rough surface coat having heat insulation properties.

11. A coating composition comprising a mixture of water-in-oil type emulsion of water and an organic binder capable of taking up oxygen when exposed to air and drying to form a tenacious film, a mineral paint pigment, and granular exfoliated micaceous material, the water being present in a quantity sufficient to provide a free flowing composition suitable for spraying, the binder being present in a quantity only sufficient to bond the micaceous material to a surface, the pigment being present in a quantity sufficient to increase fire resistance of an applied coating, the granular micaceous material being present in a quantity several times the weight of the binder and sufficient to provide a rough surface coat having heat insulation properties.

12. A coating composition comprising a mixture of water-in-oil type emulsion of water and an organic binder capable of taking up oxygen when exposed to air and drying to form a tenacious film and granular exfoliated micaceous material, all substantially of a size between an eighth and a quarter of an inch in size, the water being present in a quantity sufficient to provide a free flowing composition suitable for spraying, the binder being present in a quantity only sufficient to bond the micaceous material to a surface, the granular micaceous material being present in a quantity sufficient to provide a rough surface coat having heat insulation properties.

13. A method of making a composition having useful antisweat properties when applied to a surface and dried, the method comprising grinding a paint pigment into an organic binder capable of taking up oxygen when exposed to air and drying to form a tenacious film, the binder being in solution in a paint thinner, adding an emulsifier and water and emulsifying the resulting mixture to form a water-in-oil type emulsion, and then kneading in an exfoliated micaceous material.

FLOYD E. TRENT.